Nov. 14, 1939.  C. W. HALL  2,179,889
DIRECTION INDICATOR FOR VEHICLES
Filed Oct. 1, 1938  3 Sheets-Sheet 1

Inventor
Corliss W. Hall

By
Samuel Schmitz
Attorney

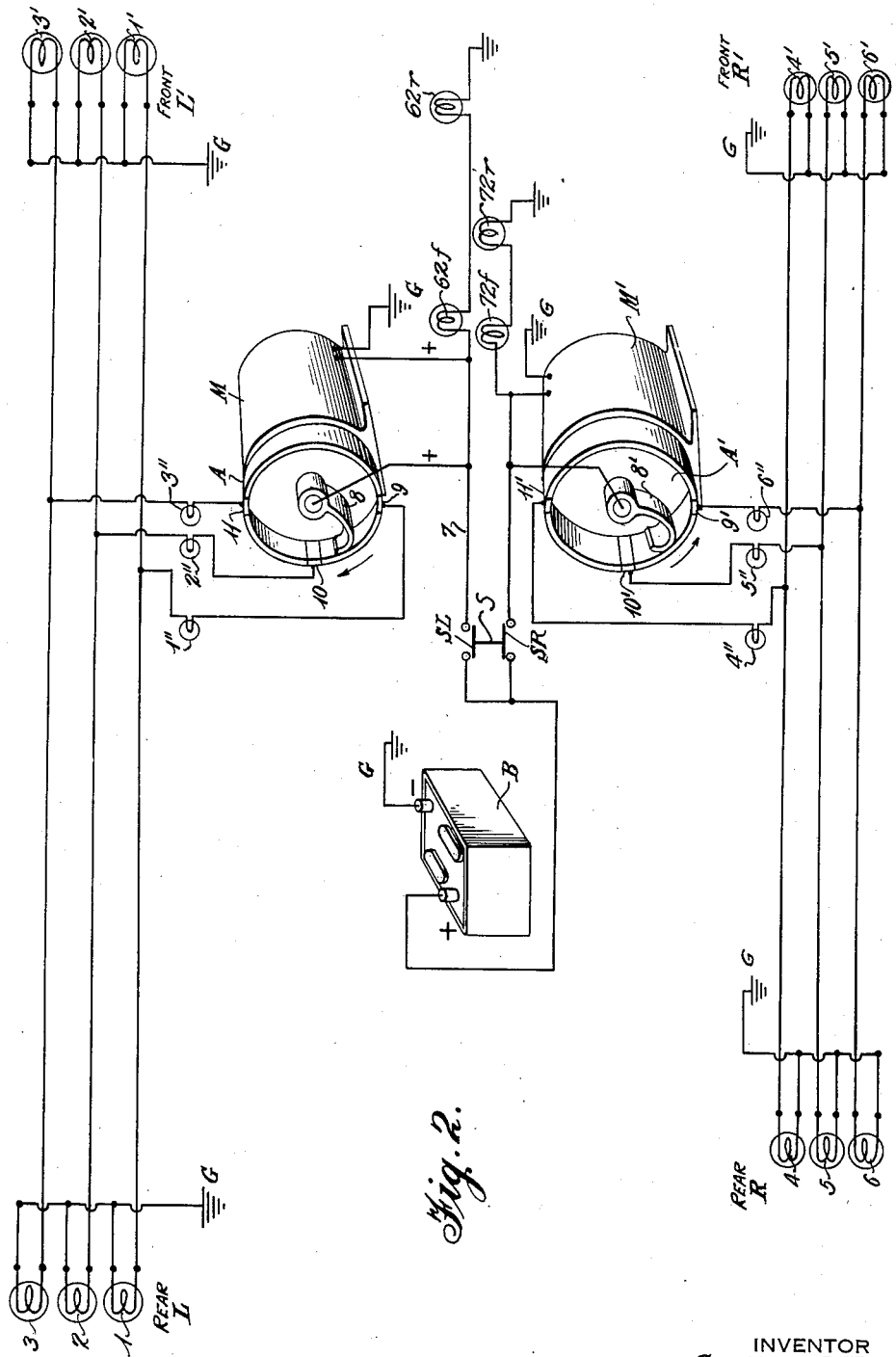

Nov. 14, 1939.   C. W. HALL   2,179,889
DIRECTION INDICATOR FOR VEHICLES
Filed Oct. 1, 1938   3 Sheets-Sheet 3

Inventor
Corliss W. Hall
By
Samuel Edmonds
Attorney

Patented Nov. 14, 1939

2,179,889

UNITED STATES PATENT OFFICE 2,179,889

DIRECTION INDICATOR FOR VEHICLES

Corliss W. Hall, Middletown, Ohio

Application October 1, 1938, Serial No. 232,868

3 Claims. (Cl. 177—329)

This invention relates to a direction indicating device for vehicles for the purpose of signalling intended turns of the vehicle to the right or the left.

It is the object of the present invention to provide a signalling arrangement upon a vehicle embodying electric lights and shields which will produce an attention-arresting signal which is controlled by the operator of a vehicle for the purpose of indicating a proposed change of direction of movement of the vehicle to those to the front and to the rear of the vehicle.

It is the object of the present invention to provide a simple and rugged structure of few moving parts serving to effectively attract attention to the signal at one glance.

The invention proceeds upon the principle of providing a signal which is instantaneous in its effect and which minimizes any possibilities of confusion of the intent of the signal by those observing it. In the preferred form of the invention, a stationary screen having a plurality of light permeable apertures arranged around a circle, is mounted in front of a plurality of light chambers arranged in sectors in a casing, the successive illumination of which gives rise to the effect of a clockwise or counterclockwise rotation of illuminated sectors in order to indicate a directional turn. The light permeable openings are preferably formed in the shape of crescents arranged in a circle to simulate a pinwheel and the concave portions of the crescents are advanced at the top of the screen to designate the direction of the turn, with which may cooperate a signalling arrow in order to complement the directional indication of the crescents which are made to appear to move in a complete circle. A further optical effect may be derived from the signalling arrangement by imparting an intermittency to the cyclical energization of the lights. This expedient of intermittent operation may be applied to a system of signal lights which are arranged in a rectilinear series as well as to one in a rotational series.

Other objects and purposes will appear from a more detailed description of the invention following hereinafter taken in conjunction with the accompanying drawings, wherein:

Figure 2 is a circuit diagram of the signalling system;

Figure 1:
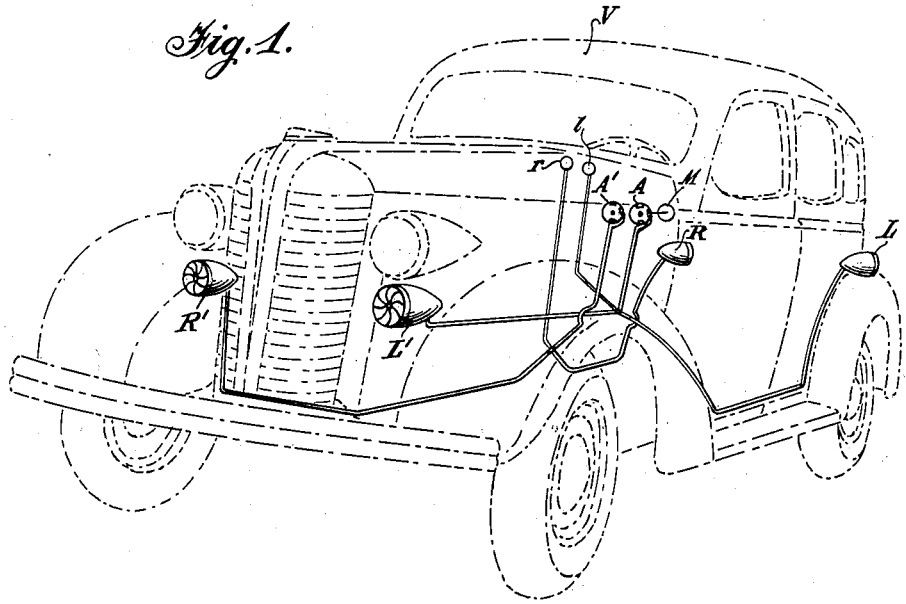
Figure 1 is a perspective view of a vehicle showing the mounting of the signalling devices thereupon and a schematic designation of the operating mechanisms therefor.

In Figure 1 is shown an automobile vehicle V which is designed to have mounted thereupon signalling devices for indicating right and left turns of the vehicle. The indicating units R and R' are disposed upon the right of the vehicle at the rear and front thereof, respectively, while the indicating units L and L' are disposed upon the left of the vehicle at the rear and front thereof, respectively. The energization of these indicating units is controlled by the operator within the car by the operation of a suitable switching mechanism when the occasion arises for him to indicate whether a turn to the left or right is to be made. If desired, only the indicating units L and R may be provided to execute the signalling towards the rear of the car only.

Each of the indicating units is similar in construction except for the distinctions pointed out below.

Figure 6:
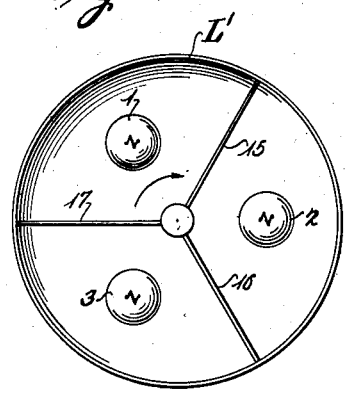
Figure 6 is a front view of the indicator unit with the screen removed from the front thereof.

In Figure 6 is shown the indicating unit L' which is subdivided into three distinct light chambers by partitions 15, 16 and 17. Electric lights 1, 2 and 3 are disposed in these chambers. A screen 30 is disposed in front of the chambers having a plurality of light permeable openings 31 therein which may be colored with contrasting colors on the opposite sides of the vehicle. For example, the indicating device R and R' may be covered with green light permeable material, of glass, Cellophane and the like, while the indicating device L and L' may be covered with red light permeable material. The openings are preferably formed of crescent shaped outlines simulating a pin-wheel and the successive energization of the lights 1, 2 and 3 produce the effect of a rotating light behind the indicating screen. An additional pointer 32 may be associated with the front shield to indicate more clearly the direction of the proposed turn. Separately controlled electric lamps 62f and 62r (Figure 2) or others in the same circuit may serve to illuminate the arrow pointer 32, whenever the groups of lamps are energized intermittently. This lamp may be in circuit continuously while the lights 1, 2 and 3 are energized intermittently or this lamp may be made to flash by means of an interrupter or other means known in the art.

In Figure 2 is shown an arrangement which may be utilized for the purpose of controlling the energization of the lights in the indicating units in the manner explained above. The operator controls a switch S to the right or left in order to energize the indicating units on the right or on the left side of the car. The switch S with its contactors may be in the form of a push button switch or a toggle switch. When a left turn is to be indicated, the switch S is operated to bridge the contacts in the battery line 7 by the contactor SL which completes the circuit from the grounded side of the battery through the battery B, the positive terminal, switch SL, line 7 to the positive terminal of a motor M the opposite end of which is grounded. The actuation of this motor operates a distributing device A insulated therefrom, provided with contact segments 9, 10 and 11 at peripherally spaced points thereof, which in conjunction with a rotary brush 8, successively completes circuits to the lamps 1, 2 and 3 at the rear of the vehicle and at 1', 2' and 3' at the front of the vehicle through connections extending from the positive main of the battery 7 to the axis of the rotary brush 8, through segments 9, 10 and 11, through the respective lamps and to ground G. In addition to the energization of the lamps at the front and rear of the vehicle, pilot lights 1'' and 2'' and 3'' are energized in the lines running to the lamps 1, 2 and 3 and 1', 2' and 3'. These pilot lights may be disposed in a casing r on the dashboard on the inside of the vehicle, (Figure 1). A failure of the respective lights 1, 1'; 2, 2'; and 3, 3' will be indicated by the failure of the corresponding pilot lights to light. Thus 3 volt bulbs inserted in the three leads extending from the distributor to the lamp lines will indicate failure in either front or rear lights.

When a turn to the right is to be made, the operator's switch S is shifted in the opposite direction to energize the same motor or another motor M' which operates a rotary distributor device A' for the purpose of successively completing circuits to lamps 4, 5 and 6 on the rear of the right side of the car vehicle and 4', 5' and 6' on the front of the right side of the vehicle in the same manner as explained above. Lamps 72f and 72r are energized by illuminating the pointer on the "right" turn indicators at the front and rear of the vehicle. Pilot lights 4'', 5'' and 6'' in the mains extending to the front and rear lights serve to indicate failure of these lights. The failure of any light in either front or rear unit will be indicated by the pilot light in series in that circuit. It is understood that a single motor may be used, with the rotary distributor devices arranged to operate in reverse directions, or these may operate in the same direction if the wiring of the contact segments to the physical placement of the light sockets in the indicating devices are reversed. Also more than three lights may be used in each of the indicating devices.

Figure 5:
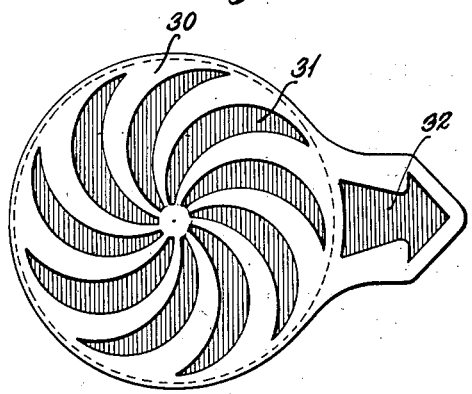
Figure 5 is a front elevation of a signal indicator applied to the front of the signalling devices.
Figure 3:
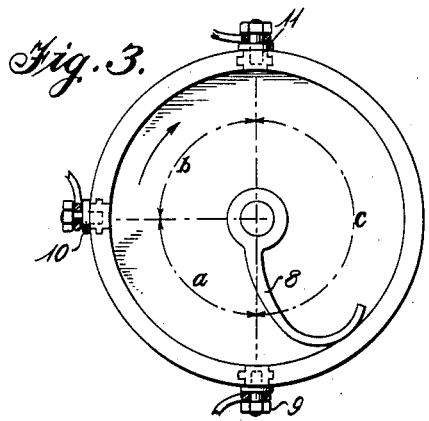
Figure 3 is a sectional view of a conventional "make and break" distributor where a common wire is carried to the rotor.

In the sectional view of the distributing device shown in Figure 3, it may be noted that the rotary gap a between segments 9 and 10, and the rotary gap b between contact segments 10 and 11 are less than the rotary gap c between contact segments 11 and 12. This spacing gives rise to a pause or a gap in the successive and cyclical energization of the signal lamps and serves to accentuate the directional effect sought to be produced thereby. Preferably, with a shield arrangement as shown in Figure 5, when the arrow 32 is lighted steadily, the contact points are spaced at 120°, while when the arrow is made to flash, the contact points are displaced 90° from each other. Likewise, with a shield arrangement as shown in Figure 7, when the arrow light is steady, the contact points may be spaced 90° apart whereas with a flashing arrow light the contact points are preferably spaced 60° apart.

Figure 4:
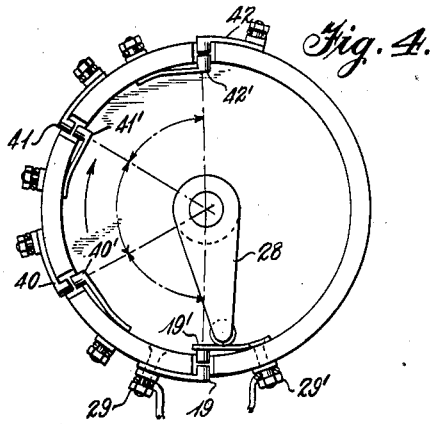
Figure 4 is a different embodiment of a distributor arrangement.

In Figure 4 is shown a distributor arrangement embodying four contact segments 19, 40, 41 and 42 which are made and broken by a rotary brush 28 operating upon cooperating contacts 19', 40', 41' and 42' to which one of the conductor wires is led. In this manner, no current is supplied to the rotating member but all of the contact terminals are stationary as indicated at 29 and 29' in Figure 4.

Figure 7:
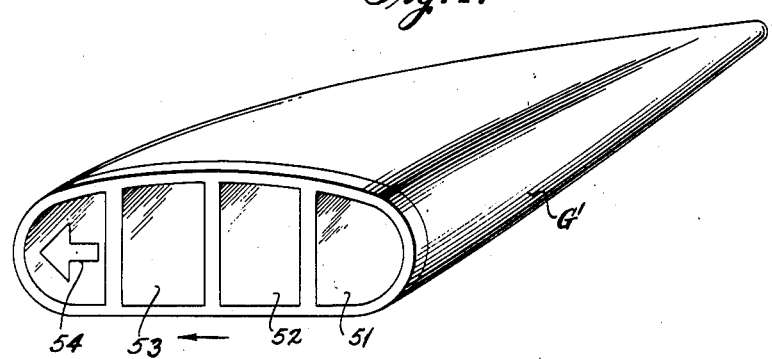
Figure 7 is a perspective view of a different embodiment of the invention.
Figure 8:
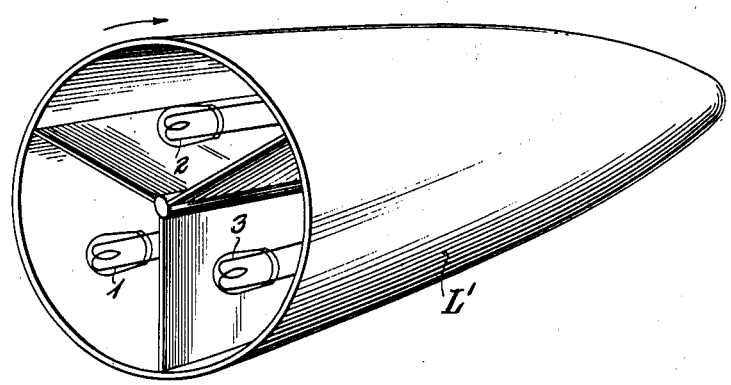
Figure 8 is a perspective view of the indicator unit shown in Figures 5 and 6.

The present invention comprehends as a different embodiment of the invention a rectilinear indicating device rather than a circular one such as shown at G' in Figure 7 wherein a plurality of illuminated sections 51, 52, 53 and 54 are successively illuminated in the order named, cyclical operation of which is interrupted by a short gap, as is provided by the distributing arrangements explained above. The pointed arrow in illuminated section 54 is relied upon to connote the proposed direction of movement, and the hesitatingly repeating cycle clarifies the signalling effect.

As shown in Figure 1, the directional turns to the right and left are indicated by apparent rotational movements in opposite directions, namely, a clockwise rotation to indicate a left turn on the left side of the machine, and a counter-clockwise rotation to indicate a right turn on the right side of the vehicle, as viewed from the front. These conditions are reversed at the rear of the vehicle.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claims.

What I claim is:

1. A vehicle signal comprising a casing divided into a plurality of radially arranged compartments forming a circle at the ends thereof, an electric lamp in each of said compartments, a circular shield member provided with a plurality of light-permeable crescent-shaped openings presenting opposed convex and concave edges around a complete circle in the form of a pin-wheel, and means for illuminating said electric lamps successively to impart to said light-permeable openings a rotary circular effect to indicate a proposed change in direction of movement of the vehicle, said rotary circular effect being executed with the concave edges in the lead.

2. A vehicle signal comprising a casing divided into a plurality of radially arranged compartments forming a circle at the ends thereof, an electric lamp in each of said compartments, a circular shield member provided with a plurality of light-permeable crescent-shaped openings presenting opposed convex and concave edges around a complete circle in the form of a pin-wheel, and means for illuminating said electric lamps successively to impart to said light-permeable openings a rotary circular effect to indicate a proposed change in direction of movement of the vehicle.

3. A vehicle signal comprising a casing divided into a plurality of radially arranged compartments forming a circle at the ends thereof, an electric lamp in each of said compartments, a circular shield member provided with a plurality of light-permeable crescent-shaped openings arranged radially in the same direction around a complete circle, means for illuminating said electric lamps successively to impart to said light-permeable openings a rotary circular effect to indicate a proposed change in direction of movement of the vehicle, and a pointer adapted to be illuminated adjacent said crescent-shaped openings to supplement the signalling effect thereof.

CORLISS W. HALL.